United States Patent [19]
Etoh et al.

[11] Patent Number: 4,464,682
[45] Date of Patent: Aug. 7, 1984

[54] AUXILIARY SCANNING CONTROL SYSTEM FOR FACSIMILE

[75] Inventors: Satoshi Etoh; Junichi Kobayashi; Kenji Tanimoto, all of Kanagawa, Japan

[73] Assignee: Fuji Xerox Co., Ltd., Tokyo, Japan

[21] Appl. No.: 377,769

[22] Filed: May 13, 1982

[51] Int. Cl.³ .............................................. H04N 1/17
[52] U.S. Cl. .................................................... 358/288
[58] Field of Search ......................................... 358/288

[56] References Cited
U.S. PATENT DOCUMENTS
4,302,781 11/1981 Ikeda et al. .......................... 358/288

Primary Examiner—John C. Martin
Assistant Examiner—John K. Peng
Attorney, Agent, or Firm—Sughrue, Mion, Zinn, Macpeak, and Seas

[57] ABSTRACT

An auxiliary scanning control system for facsimile is provided with a white line skip function to speed communication. A mechanism is provided whereby the data corresponding to the first line of information following the line skipping operation is added to that of the next line and stored in a memory unit, so that the information of the first line is not neglected in subsequent printing.

7 Claims, 4 Drawing Figures ns control system for use in facsimile apparatus in which the regions between lines of an original or the blank region of the original is fast forwarded in the auxiliary scanning direction in facsimile transmission and reception so as to reduce communication time.

AUXILIARY SCANNING CONTROL SYSTEM FOR FACSIMILE

BACKGROUND OF THE INVENTION

This invention relates to an auxiliary scanning control system for use in facsimile apparatus in which the regions between lines of an original or the blank region of the original is fast forwarded in the auxiliary scanning direction in facsimile transmission and reception so as to reduce communication time.

In a conventional auxiliary scanning control system, when the element reads a blank space on an original, a white line skip operation is generally effected. During the white line skip operation, the original is fast forwarded. When black information (data) is detected, the fast forwarding of the original is suspended, so that the original information on a line can be read out.

In such a conventional auxiliary scanning control system, the black information read out during the white line skip operation is neglected, and only the information read after the forwarding of the original has been stopped is employed as effective information. In general, there is a brief time delay between the detection time of the black information during the white line skip operation and the time at which the forwarding of the original is stopped. In other words, the position where the original is stopped may be slightly ahead of the top of the detected black data. Accordingly, the conventional auxiliary scanning control system suffers from a drawback such that when black data is read out immediately after a white line skip operation, the top portion of the black data is not read out.

SUMMARY OF THE INVENTION

Accordingly, an object of this invention is to eliminate the above-described difficulty accompanying the conventional auxiliary scanning control system. More specifically, an object of the invention is to provide an auxiliary scanning control system for a facsimile in which the top portion of the black data occurring immediately after the white line skip operation can be read out.

DETAILED DESCRIPTION OF THE PREFERRED EMBODIMENT

Figure 1A:
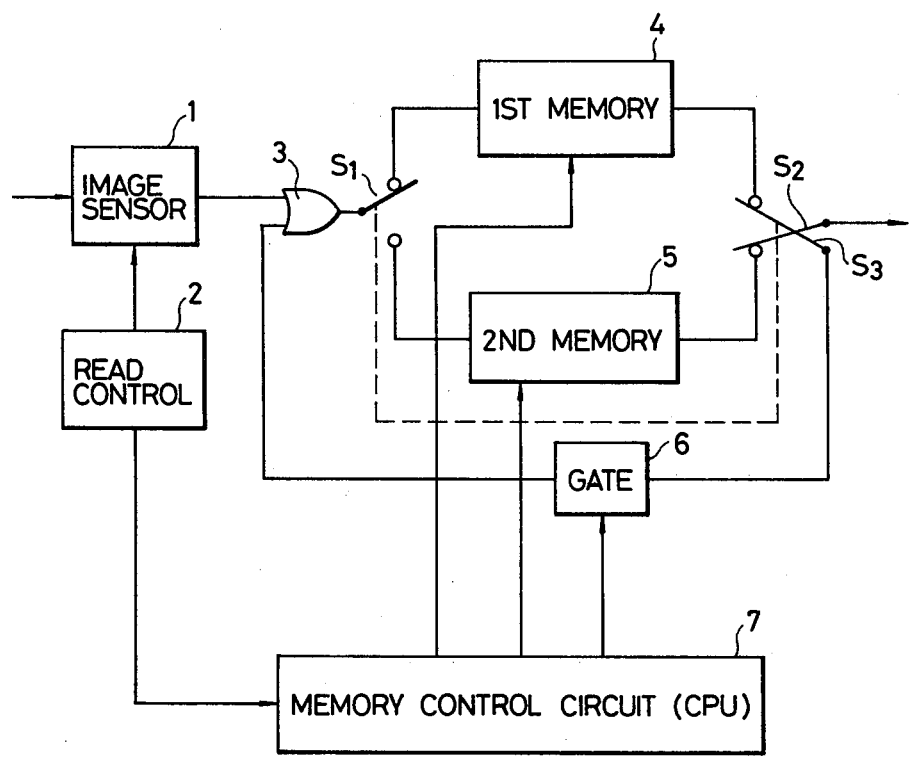
FIG. 1A is a block diagram of one embodiment of an auxiliary scanning control system for a facsimile according to this invention.

FIG. 1A is a block diagram showing one preferred embodiment of the auxiliary scanning control system according to this invention. Reference numeral 1 designates a solid scanning image sensor; 2, a read control circuit; 3, a first gate circuit; 4, a first memory circuit; 5, a second memory circuit; 6, a second gate circuit; and 7, a memory control circuit.

Figure 2:
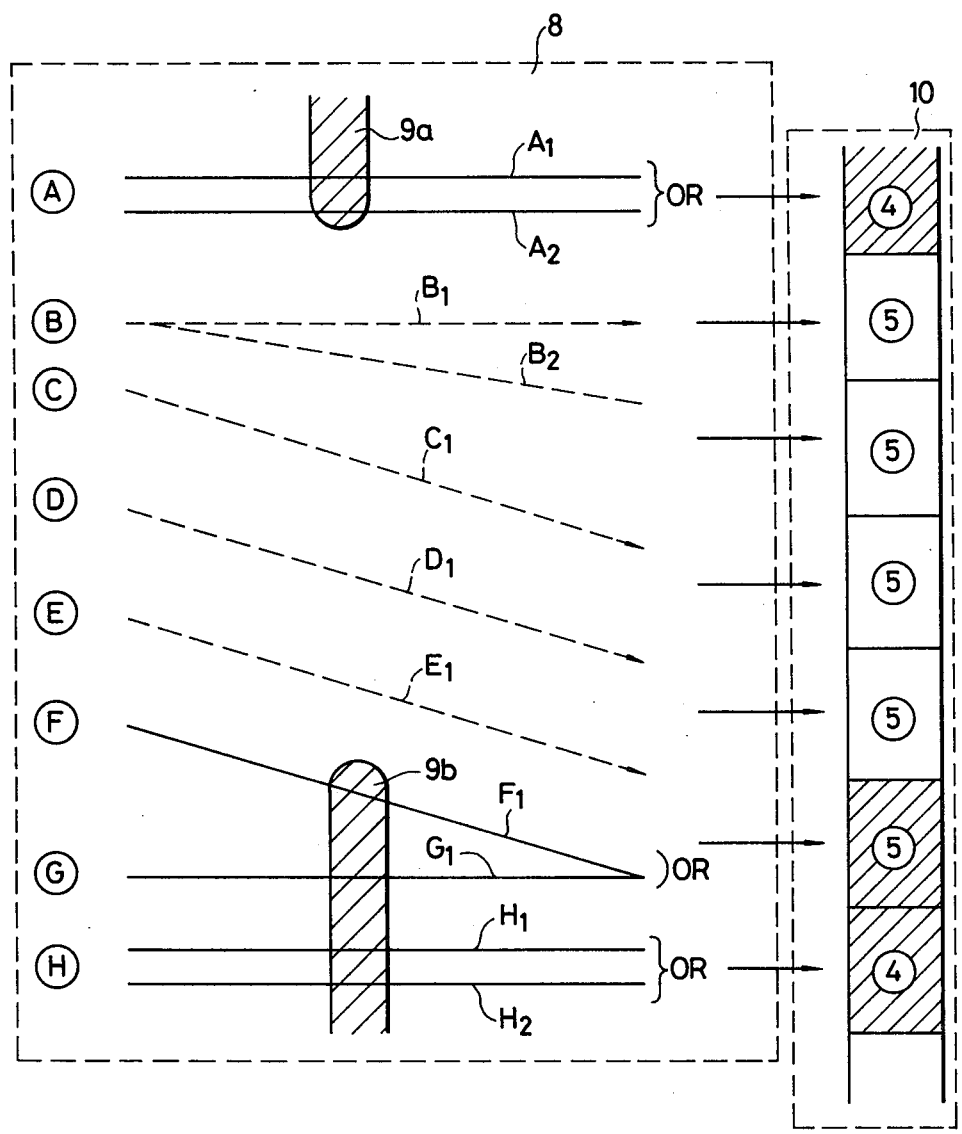
FIG. 2 is an explanatory diagram for describing the operation of the control system of FIG. 1A.

FIG. 2 is a diagram for explaining the operation of the auxiliary scanning control system shown in FIG. 1A. In FIG. 2, reference numeral 8 designates a section of an original on which is shown the scanning condition of the image sensor which scans the original line by line. Reference numeral 10 designates a memory circuit section, in which the data read out by the image sensor are stored.

In the original section 8, reference characters 9a and 9b designate black portions of the original, and reference characters $A_1$, $A_2$, $B_1$, ..., $H_1$ and $H_2$ designate the loci of the image sensor scanning the original. The locus of the image sensor made when there is black information in a line is indicated by the solid lines, and the locus of the image sensor made when there is no black information in the line is as indicated by the dotted lines. In the memory circuit section 10, reference numerals 4 and 5 designate the first and second memory circuits shown in FIG. 1A, respectively. In the memory circuit section 10, each shaded portion indicates that black information has been written into the memory circuit.

The operation of the auxiliary scanning control system of the invention will be described with reference to FIGS. 1A and 2.

The scanning image sensor 1 reads information from the original line by line in response to a control signal from the read control circuit 2. The original information thus read out is applied through the gate circuit 3 and a switch $S_1$ to either the first or second memory circuit 4, 5, and is stored therein. Each of the memory circuits 4 and 5 has a memory capacity corresponding to one line. The switches $S_1$ and $S_2$ are oppositely switched, or are switched in opposite phase to each other by a signal provided by the memory control circuit 7 according to whether or not a black signal is contained in a line provided by the read control circuit 2. For instance, in the case where data has been stored in the first memory circuit 4, the previously stored data is read out of the second memory circuit 5. Writing data into and reading data out of the first and second memory circuits 4 and 5 is controlled by control signals from the memory control circuit 7, which wll be described hereafter. In addition to the switch $S_2$, a switch $S_3$ is provided at the output side of the memory circuits 4 and 5. The switch $S_3$ is switched in phase with the seitch $S_1$. When black information is contained in a line being scanned, the gate circuit 6 is enabled to allow information to pass therethrough whereas when no black information is contained in a line being scanned, the gate circuit 6 is disabled to stop the passage of information. This control is effected by signals provided by the memory control circuit 7, which will be described hereafter.

When a line $A_1$ of the original is read out by the solid image sensor 1 as indicated in FIG. 2, the information is stored in the memory circuit 4. Since black information is contained in the line $A_1$, the control signal for enabling the gate circuit 6 is applied to the gate circuit 6 from the memory control circuit 7. As a result, the information stored in the first memory circuit 4 is delivered to the input side of the gate circuit 3, where it is added to the information on the line $A_2$ which is read out in succession. This resultant added information (Ⓐ in FIG. 2) is stored in the first memory circuit 4.

Thereafter, the switches $S_1$, $S_2$ and $S_3$ are switched in the above-described phase relations, so that subsequent information read from the original is stored in the second memory circuit 5, while the data Ⓐ stored in the first memory circuit 4 is read out. If no black data is contained in the next line $B_1$, the white line skip operation is effected beginning from the next line. During this period, the white data are stored in the second memory circuit 5. If, during the white line skip operation, black data is read from the original, the black data is written in the second memory circuit 5 and the movement of the original is stopped. Under this condition (the original being stopped), the line $G_1$ is read. Similarly as in the above-described case, the information of the line $F_1$ is applied through the second gate circuit 6 to the input side of the first gate circuit 3, where it is added to the information of the line $G_1$, and the resultant added information is written in the second memory circuit 5.

In succession, the states of the switches $S_1$, $S_2$ and $S_3$ are changed back to their original states. The information of the lines $H_1$ and $H_2$ are added, similarly as in the above-described case, and the resultant added information is stored in the first memory circuit 4, while the information $(F_1+G_1)$ obtained by adding the information of line $F_1$ to that of the line $G_1$ is read out of the memory circuit 5.

In the above-described embodiment, the information of the line $F_1$ which is neglected in the conventional system, is superposed on the information of the line $G_1$ so as to be stored in the memory circuit.

Figure 1B:
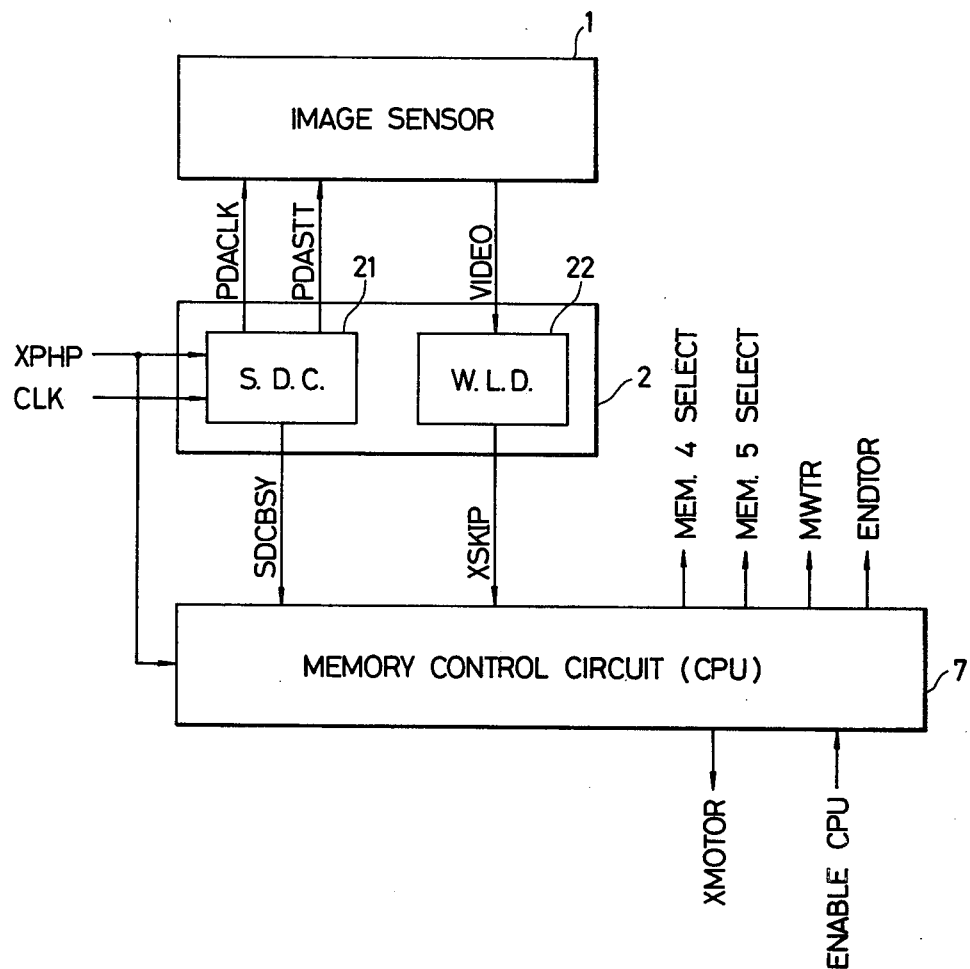
FIG. 1B is a block diagram showing part of the embodiment of FIG. 1A.
Figure 3:
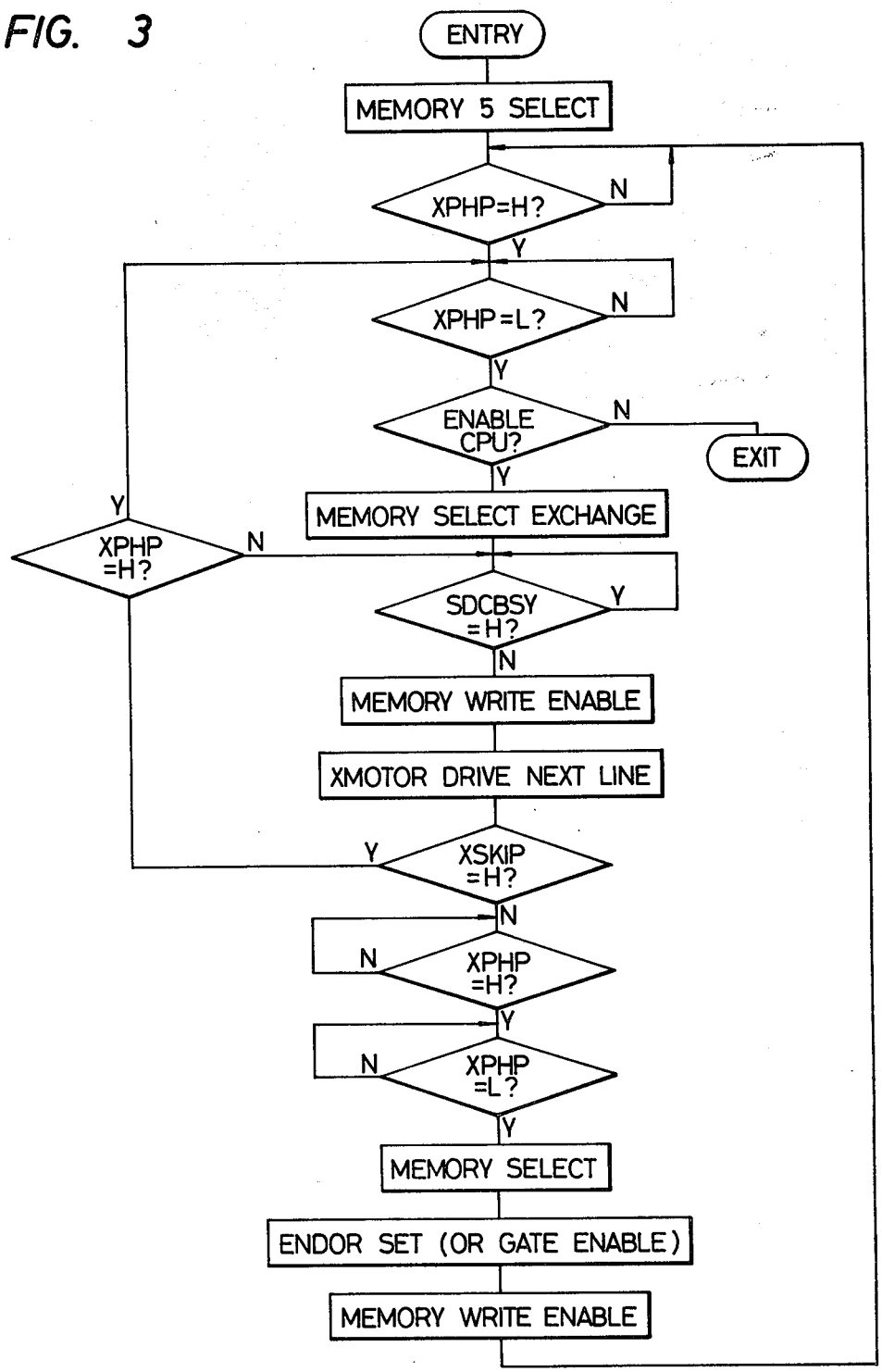
FIG. 3 is a flow chart for describing the operation of a central processing unit unit used in memory control circuit.

Next, the control operations of the memory control circuit 7, which are executed by a central processing unit (CPU), will be described with reference to FIGS. 1B and 3. FIG. 1B is a block diagram showing the image sensor 1, the read control circuit 2, and the memory control circuit (CPU) 7. FIG. 3 is a flow chart for describing one example of the sequence control executed by the CPU.

In the initial state, the second memory circuit 5 has been selected. Firstly, judgement is made as to whether or not the rising edge of an XPHP (Xmit Phasing Period) pulse signal is detected, and thereafter upon detection of the same it is determined whether the falling edge of the XPHP pulse signal is detected. The XPHP pulse signal is provided as a phase signal, for the purpose of phasing check, and has a period of, for instance, 138.9 msec within which the high level duration is set to 6.25 msec. After the falling edge of the XPHP pulse signal has been confirmed, a signal for enabling the CPU is applied to the latter and the memory 4 is selected.

An SDCBSY (Scan Data Counter Busy) pulse signal is applied to the CPU from an SDC (Scan Data Counter) 21 which, together with a WLD (White Line Detector) 22, constitutes the read control circuit 2, and it is determined whether or not the SDCBSY pulse signal is at a high level. While the SDCBSY pulse signal is maintained at the high level, the video data is read out from the original line by line by the image sensor 1. When it is judged that the SDCBSY signal is at the low level, a MWRT (Memory Write) pulse signal is issued from the CPU and the data is written in the memory 4 which has been selected. After the data is written therein, an Xmit motor (not shown) is driven by applying driving pulses thereto so that the next line can be read out.

An XSKIP (Xmit Skip Line) signal is applied to the CPU from the WLD 22, which is set at high level in the initial state and is changed to the low level when black data is contained in the line being read out by the image sensor 1. When black data is contained in the line, i.e. when the XSKIP pulse signal is at the low level, the first memory 4 is selected by the CPU upon once again effecting the phasing check. Thereafter, an ENDOR (Enable Data Or) pulse signal is issued from the CPU so that the second gate 6 is enabled to thereby add the data which has been stored in the first memory 4 to the data being currently read out by the image sensor 1. Then, the MWRT pulse signal is again issued from the CPU so that the resultant added signal is written in the memory circuit 4. The above-described routine is continuously executed.

As is apparent from the above description, according to the invention, the black information of a line detected during the white line skip operation is added to the information of the next line, and therefore the problem arising due to the top of the black information being missed. When the white line skip operation is switched back to black information reading is eliminated.

What is claimed is:

1. An auxiliary scanning control system for facsimile, comprising:
    image sensor means for outputting line data, and gate means having one input receiving said data;
    a first switch connected to the output of said gate means;
    first and second memory circuits selectively coupled to said gate means by said first switch;
    a second switch provided at the output side of said first and second memory circuits, said second switch being connected to that one of said first and second memory circuits which is then coupled to said first switch; and
    further gate means connected between said second switch and a second input terminal of said gate means, said system further including means for initiating a white line skipping operation, and for terminating said operation after black data is read during said operation, said black data read during said skipping operation being stored in one of said memory circuits, and means for adding said black data to data of the next line read.

2. A system as claimed in claim 1, further including a third switch for reading data out of said first and second memories, said switch being operated so as to be connected to that one of said first and second memory circuits not then coupled to said first switch.

3. A system as claimed in claim 1, said means for adding said black data comprising control means for enabling said further gate means to apply said black data to said gate means via said second input.

4. A system as claimed in claim 3, said gate means comprising an OR gate, whereby said black data is added to the data of the next line read.

5. A system as claimed in claim 1, and including means for feeding said original during said skipping operation, and means for halting the advance of said original following reading of said black data during said operation.

6. A system as claimed in claim 5, said next line being read when said original is stationary.

7. A system as claimed in claim 3, said control means comprising a CPU for controlling said further gate means and said memories.

* * * * *